US005902449A

United States Patent [19]

Moore

[11] Patent Number: 5,902,449

[45] Date of Patent: May 11, 1999

[54] MACHINE AND METHOD FOR APPLYING PRESSURE SENSITIVE LABELS

[76] Inventor: Charles J. Moore, 120 Niblick Rd., Summerville, S.C. 29483

[21] Appl. No.: 08/911,802

[22] Filed: Aug. 15, 1997

[51] Int. Cl.[6] ...................... B32B 31/00

[52] U.S. Cl. ...................... 156/541; 156/361; 156/542; 156/249; 156/DIG. 33

[58] Field of Search ...................... 156/541, 542, 156/540, 361, 584, 571, DIG. 33, DIG. 45, 247, 279

[56] References Cited

U.S. PATENT DOCUMENTS 4,366,023 12/1982 Voltmer ...................... 156/361 X

*Primary Examiner*—James Engel
*Attorney, Agent, or Firm*—Dallis Law Firm, P.A.

[57] ABSTRACT

A pressure sensitive labeling machine incorporating a wedge shaped suction plate assembly which uses negative pressure to assist in securing and holding the non-adhesive side of a label carrier web. The labeling machine advances the label carrier web by automatically engaging and disengaging a pinch roller assembly driven by a pneumatic piston. The pinch roller assembly obviates the need for high maintenance clutching mechanisms and multiple tension roller assemblies. A label application station applies labels to passing containers when the carrier web advances around a label separator edge of the suction plate assembly by peeling the labels from the carrier web and applying the labels via a rotating applicator roller and container catch arm.

11 Claims, 5 Drawing Sheets

MACHINE AND METHOD FOR APPLYING PRESSURE SENSITIVE LABELS

BACKGROUND OF THE INVENTION

1. Field of the Invention

The present invention relates to the field of labeling machines, and more particularly, to a relatively compact labeling machine and method incorporating the use of a suction plate assembly and air piston to control the advancement and continuous application of pressure sensitive labels from a carrier web onto containers.

2. Description of the Related Art

The prior art relating to pressure sensitive labeling devices includes a variety of specialized machines comprising differing means of applying labels to bottles or containers. Pressure sensitive labels are typically secured to one side of a non-adhesive label carrier web that is rolled into a dispensing reel. The pressure sensitive labels are evenly spaced along the label carrier web and can be peeled off the web with appropriate mechanical manipulation of the carrier web.

A device or apparatus used to continuously apply pressure sensitive labels to bottles or containers that travel along a conveyor must control numerous dynamic variables as necessary to automatically place and secure the labels onto the passing bottles or containers. These dynamic variables include dispensing the label carrier web, timing the advancement of the labels to the passing containers, separating the labels from the carrier web and securing the labels onto the container. It is crucial that both the timed advancement and placement of the label carrier web be carefully controlled and monitored so that the labels are precisely advanced and accurately placed upon the container. Typically, the label carrier web is advanced and controlled by running the carrier web through a series of tension rollers intended to keep the carrier web from slipping or sliding. A mechanical clutching device is used to engage and disengage a driving roller according to the necessary advancement of the carrier web. A serious disadvantage of using mechanical clutching devices with labeling machines is the mechanical wear experienced over time and the need to adjust and tune the clutching operation.

Most pressure sensitive label machines differ from each other in the method in which the labels are removed and placed upon the moving bottle or container. Most devices that incorporate the use of negative pressure use suction to lift the label off the carrier web and place the adhesive side of the label to the container or bottle. This may be accomplished by a rotating vacuum drum or a vacuum swivel arm.

An example of a vacuum drum device is U.S. Pat. No. 5,256,239 to Voltmer et al. described as a continuously moving web pressure-sensitive labeler for applying labels to containers. The device comprises a label applying means for stripping labels from the moving web and delivering the stripped labels to containers as they pass a label applying station. The label applying means includes the use of a rotating vacuum drum that strips the pressure sensitive label from the web by pulling the non-adhesive side of the label onto the drum after which the drum rotates and applies the adhesive side of the label to the passing container.

U.S. Pat. No. 5,061,334 to Paules is described as a machine and method for high speed, precisely registered label application with sprockets for positioning the label on a transfer wheel. This apparatus has a similar application means as the Voltmer et al. invention described above in that there is a vacuum drum used to peel the labels off the web and then apply the pressure sensitive label to a container.

A distinct use of a vacuum device is disclosed in U.S. Pat. No. 3,984,279 to Bohdan Wolodymyr Siryi which is a labeling apparatus that uses a vacuum label head that pivots on a pivot joint. The vacuum pivot head removes the non-adhesive side of the label from the carrier web and then applies the label to the surface of a container. The head incorporates a plug that is arranged to move out of a gas tight position upon contact with the label to allow application of the label to the container.

Although the present invention employs the use of a vacuum, the application of a vacuum and control of the carrier web is distinct from the prior art. A double sided suction plate assembly is used in the present invention to lightly hold the non-label side of the label carrier web to a front and rear face plate of the suction plate assembly. The suction provides sufficient tension on the label web carrier to properly control and regulate both the advancement of the carrier web and placement of the labels onto passing containers. In this way, no vacuum is used to directly manipulate the labels themselves from the label web carrier and then onto a passing container. Instead, the suction plate assembly obviates the need for multiple tension rollers to create the necessary carrier web tension to properly control the label carrier web.

The present invention replaces the mechanical clutch engaging mechanism common in the prior art with a pinch roller assembly that advances the carrier web by periodically pinching the carrier web between a pinch roller and a constant rotating pressure roller. The pinch roller is engaged when a passing container or bottle triggers a catch switch activating the pneumatic piston to push the pinch roller lever against the rotating pressure roller. This action advances the carrier web so that a label may be applied onto the passing container at the label applicator station.

SUMMARY OF THE INVENTION

It is therefore an objective of this invention to provide a pressure sensitive label application machine that uses a vacuum and suction to control the tension requirements of an advancing label carrier web.

It is further an objective of this invention to provide a facile piston mechanism to engage and disengage the advancement of a label carrier web in place of the more commonly used mechanical clutch.

It is still further an objective of this invention to provide a label applicator machine that requires minimum maintenance and moving parts.

These as well as other objectives are accomplished by a labeling machine used for applying labels to containers. Pressure sensitive labels are carried via a non-adhesive carrier web supplied in reels. The carrier web is advanced by a pinch roller assembly incorporating a pneumatic piston, piston arm, a pinch roller lever and a pinch roller. The pinch roller and a rotating pressure roller advance the label web carrier as a double sided suction plate assembly maintains proper tension on the non-label side of the web carrier. A separator edge on the suction plate assembly causes the labels to separate from the web carrier as the web carrier travels around the separator edge causing the individual labels to peel from the more flexible web carrier. A rotating applicator roller assists in the application of the label to the container or bottle at the application station.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
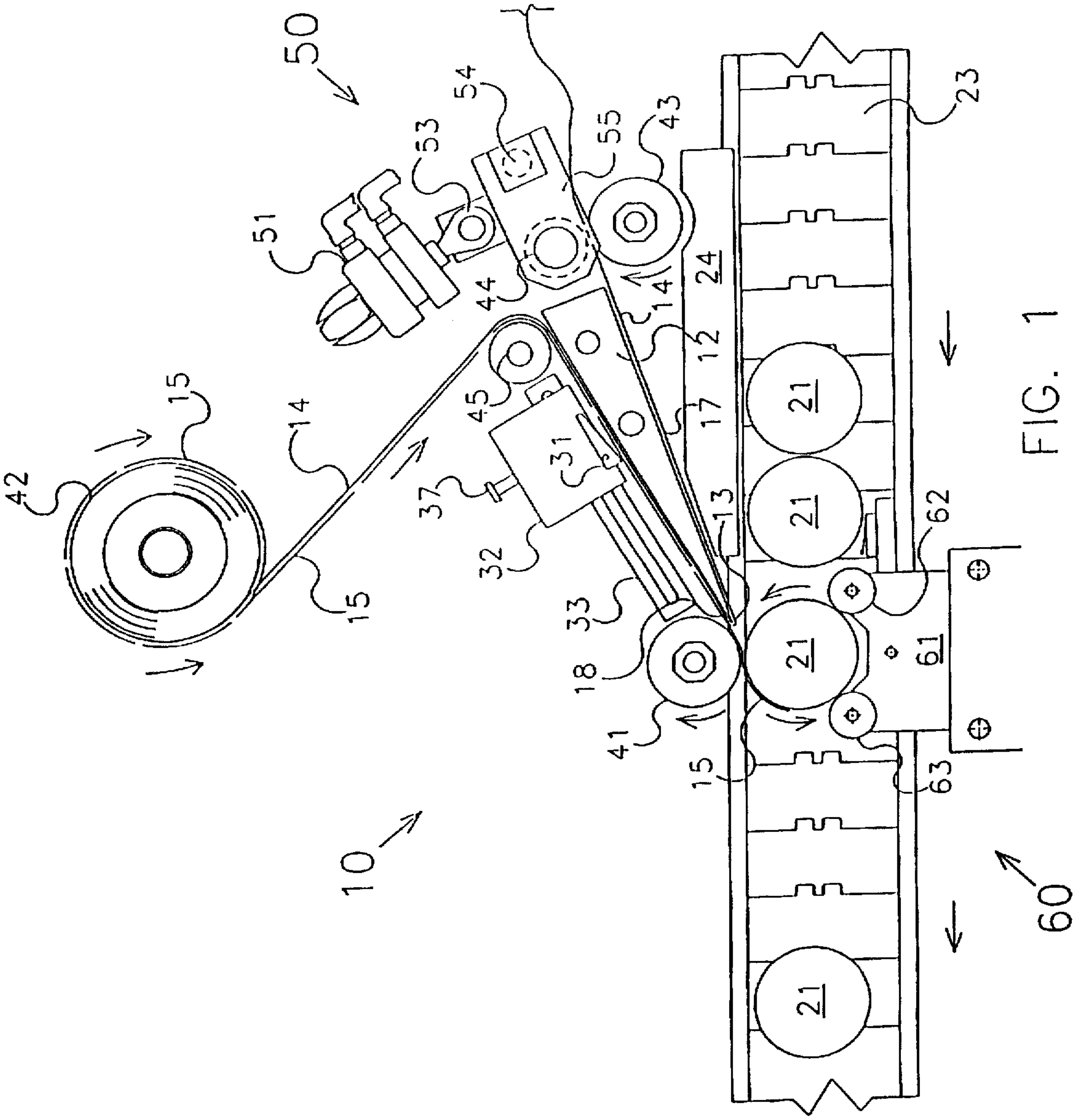
FIG. 1 of the drawings is a top schematic view of the labeling machine.

Referring to the drawings by numerals of reference, there is shown in FIGS. 1, 2, 3 and 4 the labeling machine (10) used for applying pressure sensitive labels to passing articles or containers (21). FIG. 1 reveals the major components of the labeling machine (10) including a double sided suction plate assembly (12), a label application station (60) and a pinch roller assembly (50).

Referring to FIG. 1, the labeling machine (10) is shown having a dispensing reel (42) consisting of a roll of labels (15) supplied on a label carrier web (14). The label carrier web (14) travels from the dispensing reel (42) around an idler roller (45) and along the front face plate (18) of the wedge-shaped suction plate assembly (12). The suction plate assembly (12) has a front face plate (18) and a rear face plate (17) designed to firmly hold the non-label side of the carrier web (14) while still allowing the carrier web (14) to advance along the front and rear face plates (18 and 17). As more clearly depicted in FIGS. 3 and 4, a negative pressure is created within the wedge shaped suction plate assembly (12) causing suction orifices (16), located on the surface of the front face plate (18) and the rear face plate (17), to hold the carrier web (14) in place as it is advanced through the labeling machine (10).

A label application station (60) is located at the end of the suction plate assembly (12) where the labels (15) are applied to passing containers (21). The labels (15) are peeled away from the label carrier (14) as the label carrier (14) passes around the sharp angle formed by the label separator edge (13) of the suction plate assembly (12). The leading edge of an advancing label (15) contacts a container (21) passing down an adjacent container conveyor (23). The label (15) is applied to the container (21) as the container (21) rotates between the applicator roller (41) and the forward catch roller (63) and the rear catch roller (62) of an engaged container catch arm (61).

After the label (15) is peeled from the carrier web (14) at the label applicator station (60), the carrier web (14) continues traveling along the rear face plate (17) of the suction plate assembly (12) and through the pinch roller assembly (50) which acts as the primary advancing mechanism of the labeling machine (10). Continuing with reference to FIG. 1, the pinch roller assembly (50) includes a pneumatic piston (51) which, when engaged, pushes a piston arm (53) against a pinch roller lever (55). The pinch roller lever (55) pivots around a pinch roller pivot axle (54). The pneumatic piston (51) engages the pinch roller lever (55) by causing a pinch roller (44), secured to the arching end of the pinch roller lever (55), to compress against a constant velocity rotating pressure roller (43). The carrier web (14) is advanced through the labeling machine (10) as the carrier web (14) is sandwiched between the pinch roller (44) and rotating pressure roller (43).

One of the advantages of the operation of the pinch roller assembly (50) in the present invention is that it causes the carrier web (14) to slightly reposition itself when the pinch roller (44) releases or disengages. The typical clutch operated labeling machine has a series of tension rollers and uptake rollers that are engaged and disengaged by a clutching mechanism. Under such circumstances, the carrier web may have a tendency to ride up or down the rollers over a period of time if there are no adjustment mechanisms in place. This will cause the label to be misplaced on the container or bottle. The present invention obviates this problem by reducing the number of tension rollers and through the periodic release of the carrier web by the pinch roller assembly (50). As a result, there is not the tendency of the carrier web to ride up or down the rollers over time.

Figure 2:
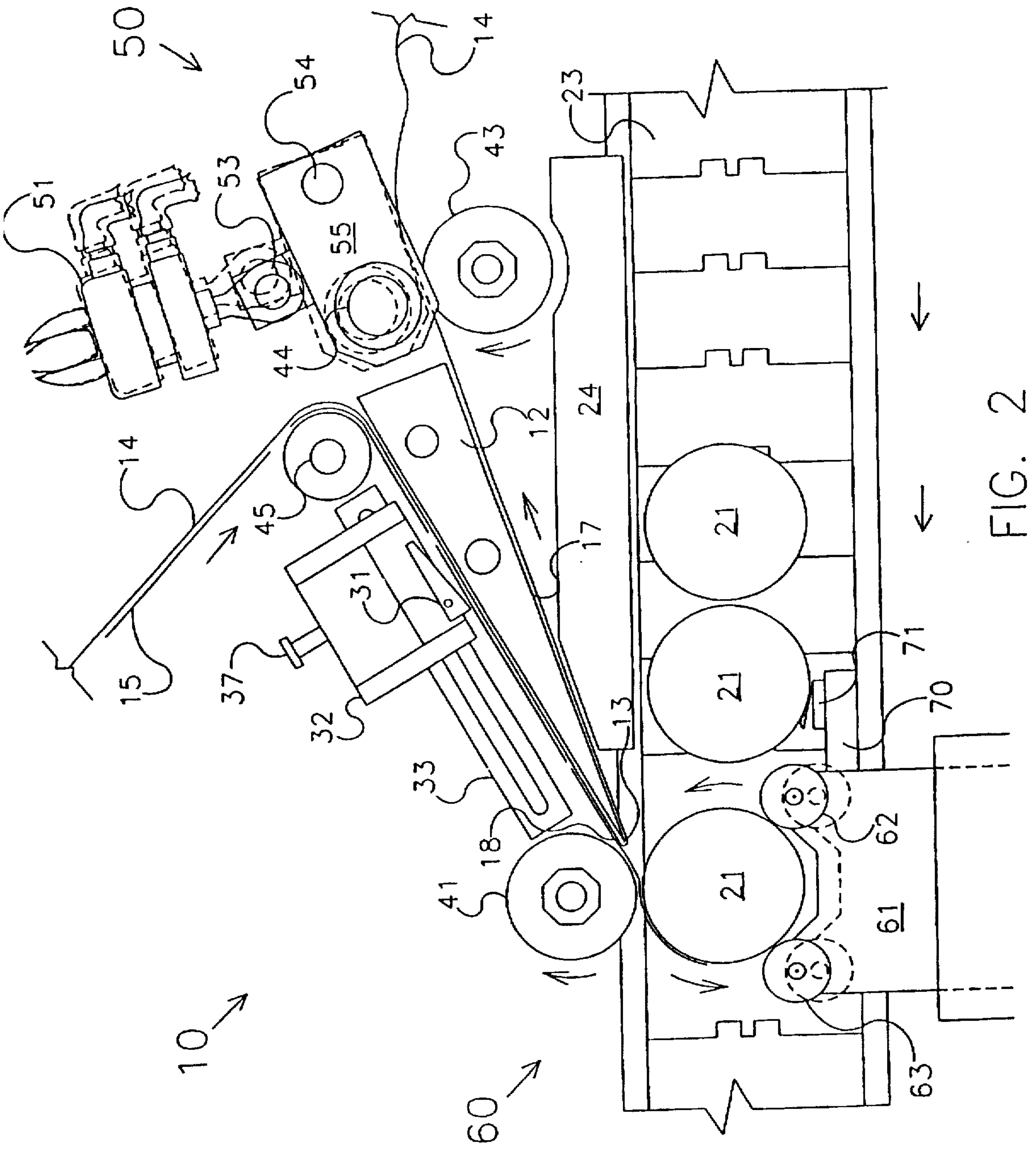
FIG. 2 of the drawings is a close-up top schematic view of the labeling machine revealing various engagement means.

Referring to FIG. 2, a closer view of the automated operations of the labeling machine (10) can be observed. As a container (21) advances along the conveyor (23), the labeling machine (10) automatically recognized the approaching container (21) so that the carrier web (14) may be properly advanced and label (15) applied to the container (21). As the container (21) passes along side a conveyor container guide (24), the opposite side of the container (21) mechanically triggers a container catch switch (71) of the container switch assembly (70). The container catch switch (71) electronically indicates to both the pinch roller assembly (50) and label applicator station (60) to advance the carrier web (14) and engage the container catch arm (61) in a coordinated fashion. As the passing container (21) is sandwiched between the forward and rear catch rollers (63 and 62) of the container catch arm (61) and the rotating applicator roller (41), the pneumatic piston (51) pushes the pinch roller (44) against the rotating pressure roller (43) advancing the carrier web (14). All the while, the carrier web (14) is firmly held against both the front face plate (18) and rear face plate (17) of the suction plate assembly (12). During the advancement of the web carrier (14), the leading edge of a label (15) peels away from the carrier web (14) at the label separator edge (13) of the suction plate assembly (12) and is applied to the rotating container (21). The adjacent rotating applicator roller (41) acts as both a rotating mechanism and label pressure applicator to apply the label (15) against the rotating container (21). The label applicator station (60) and pinch roller assembly (50) are disengaged by a label detector switch (31) that determines when the end of the label (15) has been advanced sufficiently to be applied to a container (21).

Still referring to FIG. 2, the label detector switch (31) is mounted on a label detector assembly (32) which can be adjusted along the length of a switch assembly track (33) depending upon the particular label (15) length. The label detector assembly (32) is secured against the switch assembly track (33) by a label switch adjuster (37). Since the label detector switch (31) is responsible for disengaging the carrier web (14) advancement as well as the positioning of the container catch arm (61) after detecting the end of a label (15), a shorter length label (15) requires the label detector assembly (32) to be adjusted closer to the rotating applicator roller (41) end of the switch assembly track (33). A longer length label (15) requires the label detector assembly (32) to be adjusted toward the idler roller (45) end of the switch assembly track (33).

Figure 3:
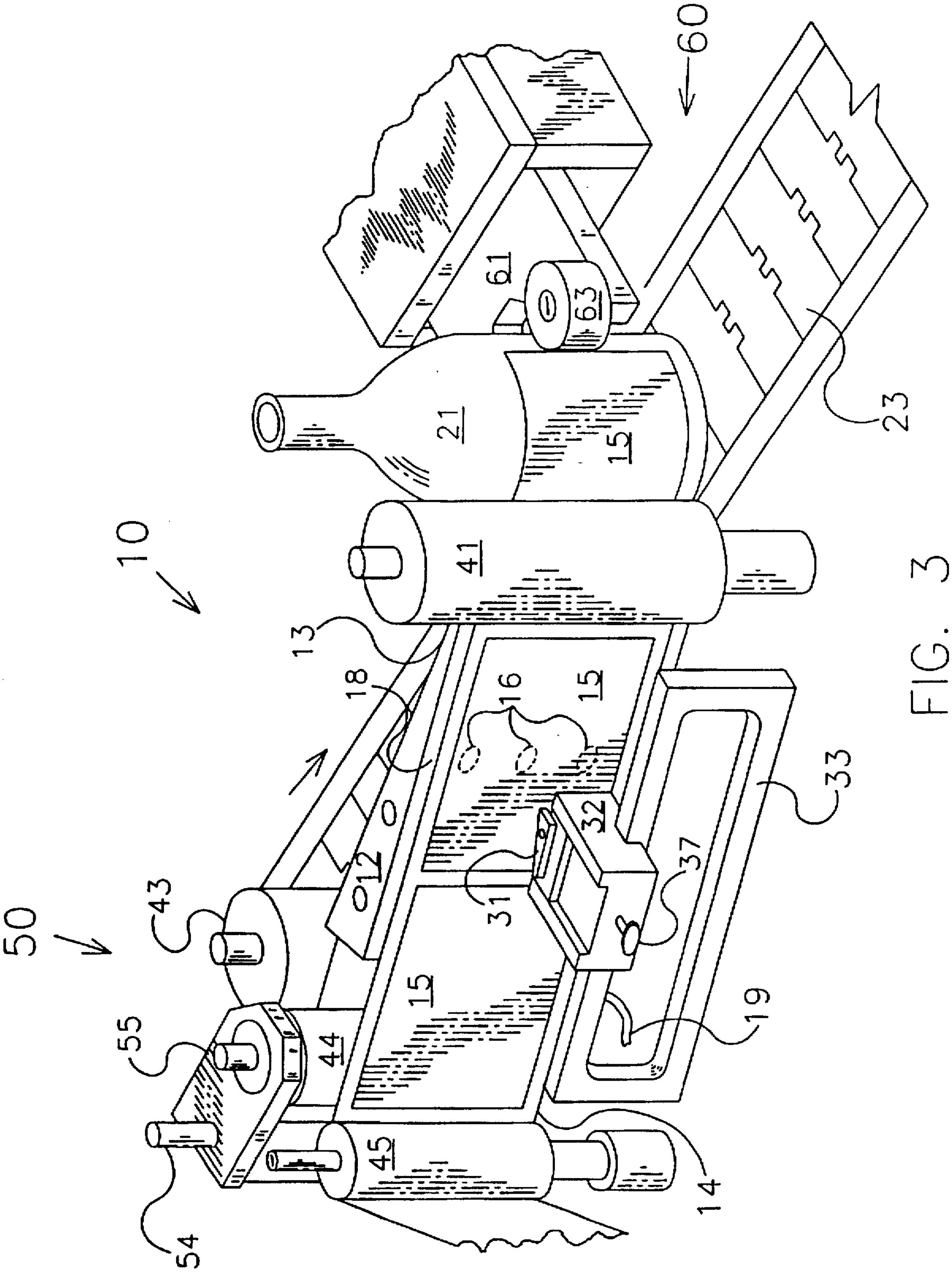
FIG. 3 of the drawings is a perspective side view of the labeling machine depicting the front face plate of the suction plate assembly.
Figure 4:
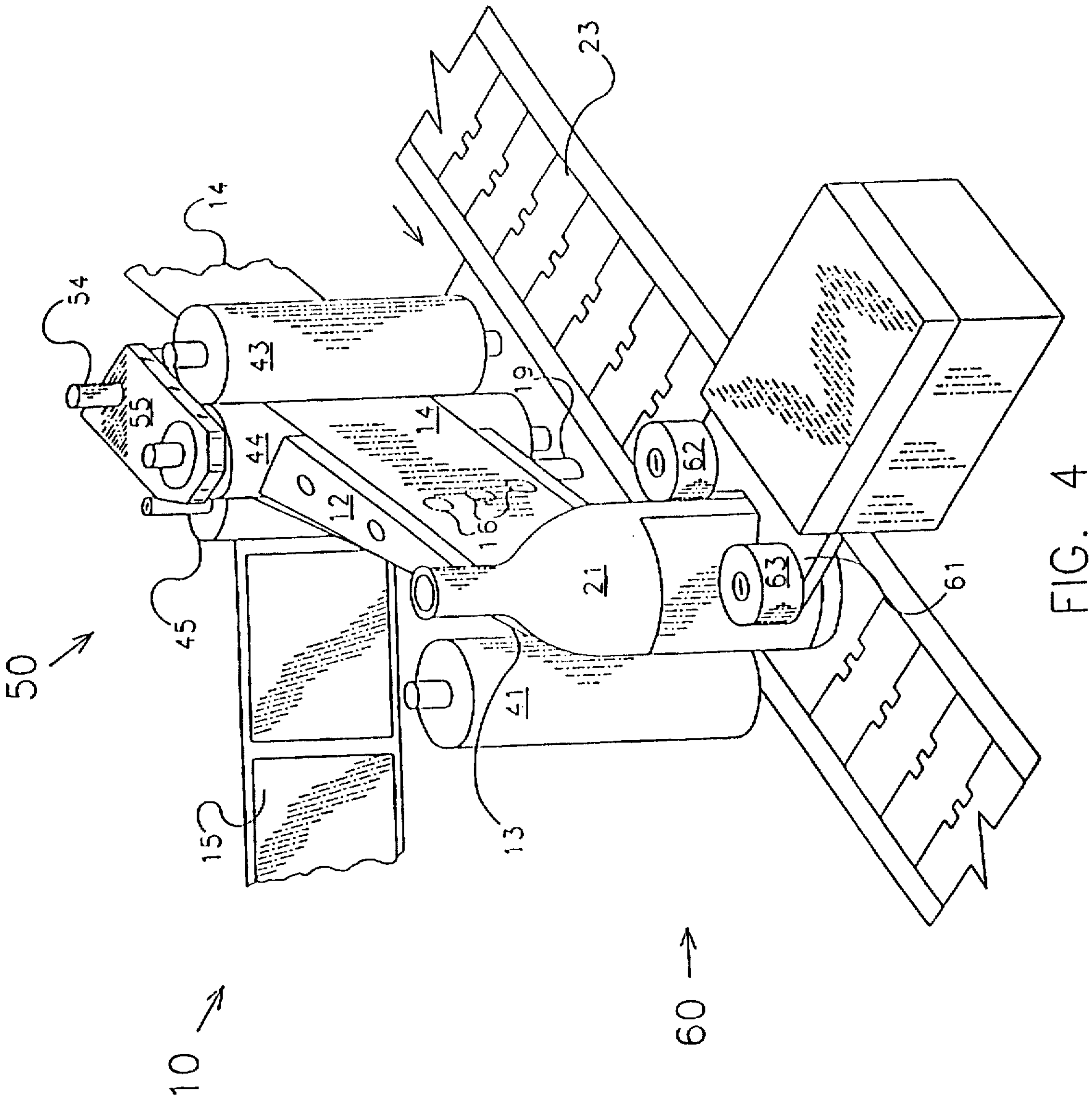
FIG. 4 of the drawings is a perspective side view of the labeling machine depicting the back face of the suction plate assembly.

Referring to FIG. 3, a perspective view of the labeling machine (10) shows the front face plate (18) of the suction plate assembly (12) and label application station (60). This perspective view most clearly displays the operation of the suction plate assembly (12) and how it is designed to lightly hold the non-label side of the label carrier web (14). In the preferred embodiment, the suction plate assembly (12) comprises a hollow wedge shaped suction device having an internal negative pressure created by suction tubes (19). A plurality of suction orifices (16) located on both the front face plate (18) and rear face plate (17) (as depicted in FIG. 4), lightly hold the non-label side of the web carrier against the front and rear face plates (18 & 17.) When a container (21) or bottle triggers the container catch switch (71) as displayed in FIG. 2 and described above, the pinch roller (44) is pushed against the constant rotating pressure roller (43) which causes the carrier web (14) to advance. Both the rotating pressure roller (44) and the rotating application roller (41) are of equal diameters and have identical rotational speeds. At the same time that the carrier web (14) is engaged, the passing container (21) is pushed against the rotating pressure roller (43) by the container catch arm (61). The label (15) is simultaneously peeled from the label separator edge (13) and pressed or applied against the rotating container (21) by the rotating pressure roller (41). During the application process, the container (21) is held, rotating in place, by the forward and rear catch rollers (63 and 62) and the rotating pressure roller (41). The container conveyor (23) is TEFLON or non-stick coated to allow the bottom of the container conveyor (23) to slide underneath the container (21).

Still referring to FIG. 3, the adjustable features of the label detector switch (31) are revealed showing the switch assembly track (33) designed to allow the label detector assembly (32) to be adjusted forward or backward according to the specific length of the label (15). The label detector switch (31) is a mechanical switch that senses the passing labels (15) on the carrier web (14). After the label has traveled the requisite distance and been applied to the container (21), the label detector switch (31) monitors the position of the next label to be applied and sends an electronic signal to the pneumatic piston (51) of the pinch roller assembly (50) disengaging the pinch roller lever (55). This action stops the advancement of the carrier web (14). The container catch arm (61) simultaneously disengages the container (21) which allows the container (21) to continue riding down the container conveyor (23).

Referring to FIG. 4, a perspective view of the rear face plate (17) of the suction plate assembly (12) is provided showing the container conveyor (23) side of the label application station (60) and pinch roller assembly (50). The position of the container (21) and stage of label application is the same in FIG. 4 as it is in FIG. 3. The label (15) has been sheared or peeled from the carrier web (14) by the travel of the carrier web (14) around the sharp angle of the label separator edge (13). After having a label (15) stripped from its surface, the label carrier web (14) advances along the rear face plate (17) of the suction plate assembly (12) held firmly against the rear face plate (17) by the suction orifices (16). The negative pressure within the suction plate assembly (12) is created by suction tubs (19) running into the wedge shaped suction plate assembly (12).

Still referring to FIG. 4, a perspective view of the pinch roller assembly (50) shows the "de-labeled" carrier web (14) being pulled or advanced between the rotating pressure roller (43) and the pinch roller (44). The pinch roller (44) is pushed against the rotating pressure roller (43) by the pneumatic piston (51) which is more clearly illustrated in FIG. 2. The portion of the carrier web advancing beyond the pinch roller assembly is simply discarded or collected on a take up reel if desired.

Figure 5:
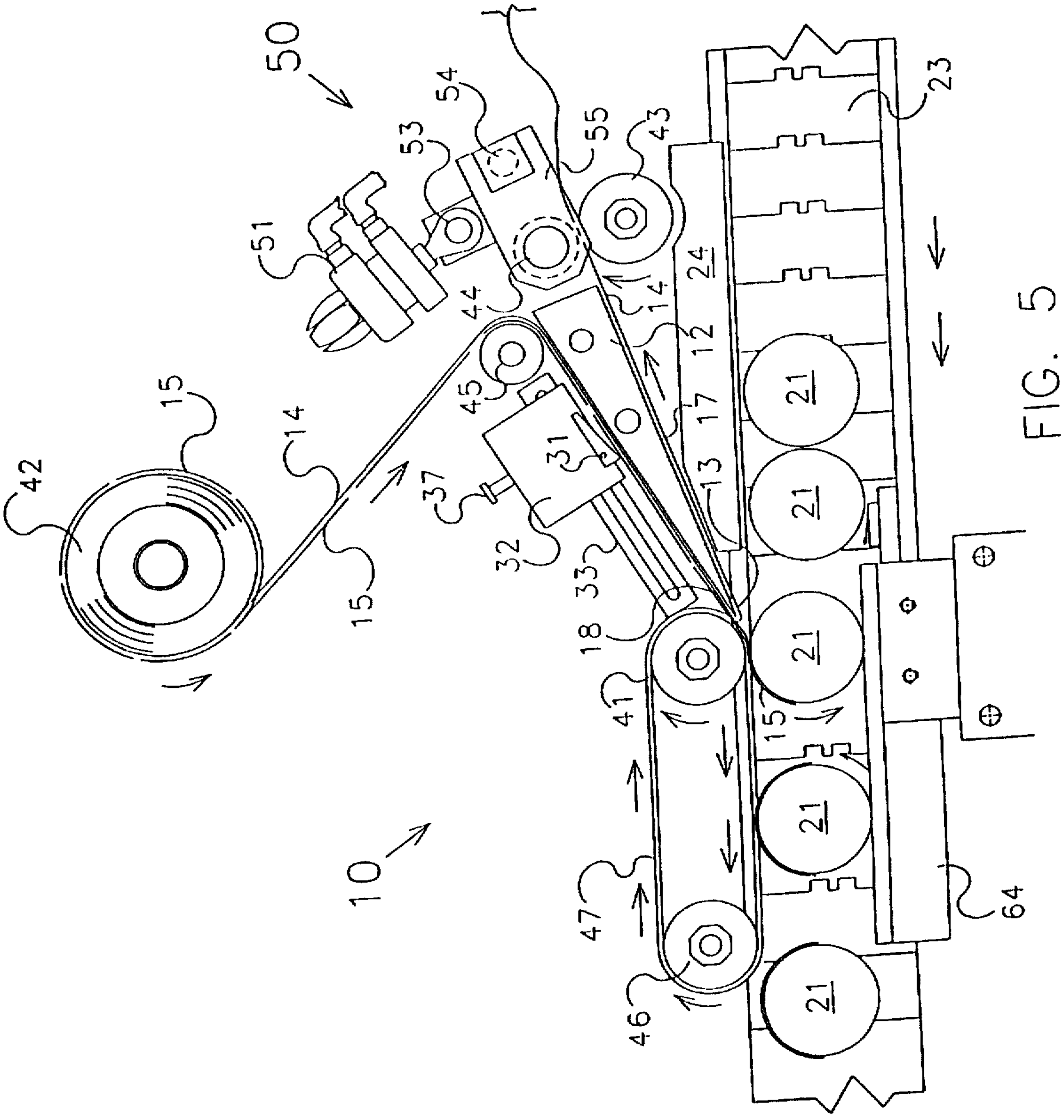
FIG. 5 of the drawings is a top schematic view of the labeling machine illustrating a high speed label wiping station attachment.

Referring to FIG. 5, an alternate label wiping station is shown for higher speed labeling of containers (21). FIGS. 1–4 illustrate a label applicator comprising the label application station (60) which applies labels (15) to containers (21) one container at a time. As illustrated in FIG. 2, the container (21) does not advance forward from the label application station (60) until the label (15) is applied completely to the container (21) as the container (21) rotates in place. FIG. 5 illustrates the use of a labeling belt (47) looped around the rotating applicator roller (41) and a forward labeling belt roller (46) for higher speed application of labels (15) to containers (21) After a leading edge of a label (15) has been applied to a passing container (21), the container (21) continues moving forward along the container conveyor (23). The labeling belt (47) applies pressure on the container (21), pushing the container (21) against a rubberized labeling contact wall (64) located opposite and parallel to the labeling belt (47) across the container conveyor (23). This pushing action against the container (21) causes the container (21) to rotate as it advances along the container conveyor (23). The rotation of the container (21) against both the labeling belt (47) and the labeling contact wall (64) allow the label (15) to be adhered to the container (21) simultaneously with the forward advancement of the container (21) along the container conveyor (23). The wiping station depicted in FIG. 5 applies labels (15) to containers (21) continuously without halting the forward motion of containers (21) along the container conveyor (23) thereby allowing for a greater through put of containers (21).

A preferred embodiment of the present invention is described herein. It is to be understood, of course, that changes and modifications may be made in the embodiment without departing from the true scope and spirit of the present invention as defined by the appended claims.

That which is claimed is:

1. A device for applying pressure sensitive labels to articles, comprising in combination:

a suction plate assembly having a front face plate with a front plate exterior surface, said front face plate having at least one front plate suction orifice;

a source of negative pressure proximate said front plate suction orifice on said front plate exterior surface of said front face plate, said source of negative pressure firmly holding a carrier web against said front face plate, said carrier web having said pressure sensitive labels attached to a label side of said carrier web, said carrier web having a non-adhesive, non-label side opposite said label side of said carrier web, said front face plate holding said non-label side of said carrier web against said front plate exterior surface of said front face plate;

a means for advancing said carrier web over said front face plate while said source of negative pressure necessary for holding said non-label side of said carrier web is maintained against said front plate exterior surface of said front face plate;

a label separator edge attached to said suction plate assembly, said label separator edge being a sharply angled edge around which said carrier web tightly travels causing said labels on said label side of said carrier web to peel away from said carrier web, said labels having a label adhesive side and a label non-adhesive side;

a container conveyor running adjacent said suction plate assembly, said container conveyor being a moving track upon which at least one container is automatically conveyed past said label separator edge of said suction plate assembly; and a means for applying said label adhesive side of said label to said container.

2. The device for applying pressure sensitive labels to articles according to claim 1 further comprising a means for engaging said means for advancing said carrier web over said front face plate.

3. The device for applying pressure sensitive labels to articles according to claim 1 further comprising a means for determining a label position for disengaging said means for advancing said carrier web over said front face plate.

4. The device for applying pressure sensitive labels to articles according to claim 2 wherein said means for engaging said means for advancing said carrier web over said front face plate comprises a container catch switch extending slightly into a travel pathway of said container traveling on said container conveyor as said container travels near said label separator edge of said suction plate assembly, said container catch switch being a mechanical switch triggered by said passing container signaling said means for advancing said carrier web to be engaged.

5. The device for applying pressure sensitive labels to articles according to claim 3 wherein said means for determining a label position for the purpose of disengaging said means for advancing said carrier web over said front face plate comprises:

a label detector switch being a depth sensitive mechanical switch positioned against said label side of said carrier web in front of said front plate exterior surface of said front face plate, said label detector switch being triggered, thereby disengaging said means for advancing said carrier web, when a label end of said label attached to said carrier web advances past said label detector switch;

a label detector adjuster providing depth adjustment of said label detector switch for varying thicknesses of said label; and a label assembly track secured along a length of said front face plate, said label detector switch slidably attached to said label assembly track for repositioning said label detector switch along said front face plate of said suction plate assembly according to a predetermined length of said label attached to said carrier web.

6. The device for applying pressure sensitive labels to articles according to claim 1 wherein said means for advancing said carrier web over said front face plate comprises a pinch roller assembly comprising:

a pneumatic piston having an in-position and an out-position, said out-position corresponding to an engaged position of said pinch roller assembly;

a pinch roller lever having an arcing end and a pivot end, said pinch roller lever pivoting about a pinch roller pivot axle at said pivot end of pinch roller lever;

a pinch roller attached to said arcing end of said pinch roller lever, said pinch roller rotating freely about a pinch roller axle parallel to said pinch roller pivot axle;

a rotating pressure roller adjacent and parallel to said pinch roller, said rotating pressure roller having a continuous and consistent clockwise rotational velocity; and a piston arm having a piston end and a lever end, said piston end connected to said pneumatic piston and extending outward from said pneumatic piston when said pneumatic piston is in said out-position, said lever end of said piston arm connected to said pinch roller lever between said arcing end and said pivot end of said pinch roller lever causing said pinch roller lever to pivot about said pinch roller pivot axle when said pneumatic piston alternates between said in-position and said out-position, said carrier web laying between said rotating pressure roller and said pinch roller and being advanced by said pinch roller assembly when said pneumatic piston engages into said out-position resulting in contact between said pinch roller and said rotating pressure roller.

7. The device for applying pressure sensitive labels to articles according to claim 4 wherein said means for applying said label adhesive side of said label to said container comprises a label application station comprising:

a rotating applicator roller located adjacent said container conveyor proximate said label separator edge of said suction plate assembly, said rotating applicator roller having a continuous and consistent clockwise rotational velocity; and a container catch arm located adjacent said container conveyor opposite said rotating applicator roller having a rear catch roller and a forward catch roller for halting forward movement of said container and allowing said container to rotate against said rotating applicator roller after said means for advancing said carrier web has advanced a label edge separated from said carrier web by said label separator edge between said rotating applicator roller and said container, said container catch arm being engaged by said container catch switch and said container catch arm holding said container by extending transversely across said container conveyor into said travel pathway of said container as said container passes said label separator edge of said suction plate assembly and said label edge is advanced between said container and said rotating applicator roller, said forward catch roller contacting a forward-side portion of said container while said rear catch roller contacts a rear-side portion of said container allowing said container to counter rotate against said rotating applicator roller.

8. The device for applying pressure sensitive labels to articles according to claim 1 wherein said suction plate assembly is wedge-shaped member having a hollow interior further comprising:

a rear face plate angled opposite said front face plate such that said front face plate and said rear face plate represent opposing elongated sides of said wedge-shaped member while said label separator edge represents a vertex of said wedge-shaped member, said rear face plate having a rear plate exterior surface, said rear face plate having at least one rear plate suction orifice, said source of negative pressure creating a vacuum within said hollow interior of said wedge-shaped member such that ambient air is drawn through said rear plate suction orifice into said hollow interior allowing said non-adhesive, non-label side of said carrier web to be held firmly against said rear face plate as said carrier web is advanced around said wedge-shaped member of said suction plate assembly.

9. The device for applying pressure sensitive labels to articles according to claim 8 wherein said source of negative pressure comprises a vacuum pump having suction tubes running into said wedge-shaped member providing suction of air through said rear plate suction orifice and said front face suction orifice.

10. A method for applying pressure sensitive labels to articles, comprising in combination:

supplying a carrier web, having attached pressure sensitive labels, from a dispensing reel to a wedge-shaped suction plate assembly;

securing a non-label side of said carrier web to a front face plate and rear face plate of said suction plate assembly by air suction;

advancing said carrier web over said front face plate and said rear face plate by pinching said carrier web between a rotating pressure roller and a pinch roller;

engaging said pinching by triggering a container catch switch with a conveyed container traveling down a container conveyor;

separating said label from said carrier web by moving said web carrier over a sharply angled separator edge of said wedge-shaped suction plate assembly, peeling said label from said web carrier; and applying said label to said container.

11. The method for applying pressure sensitive labels to articles according to claim 10, wherein said applying said label to said container comprises:

synchronizing said advancing of said web carrier such that a label edge of said label is separated from said carrier web extending into a pathway of said container traveling down said container just as said container passes said sharply angled separator edge of said suction plate assembly;

pushing said container against a rotating applicator roller using a container catch arm having a forward catch roller and a rear catch roller; and rotating said container counter to said rotating applicator roller while said label is sandwhiched between said container and said rotating applicator roller with an adhesive label side against said container.

* * * * *